United States Patent
Kong et al.

(10) Patent No.: US 7,413,721 B2
(45) Date of Patent: Aug. 19, 2008

(54) METHOD FOR FORMING AMMONIA

(75) Inventors: Peter C. Kong, Idaho Falls, ID (US);
Robert J. Pink, Pocatello, ID (US);
Larry D. Zuck, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 363 days.

(21) Appl. No.: 11/191,770

(22) Filed: Jul. 28, 2005

(65) Prior Publication Data
US 2007/0025903 A1 Feb. 1, 2007

(51) Int. Cl.
*C01C 1/02* (2006.01)
*C01B 21/06* (2006.01)
*C01B 3/04* (2006.01)

(52) U.S. Cl. .................. 423/353; 423/409; 423/411; 423/658.2

(58) Field of Classification Search .......... 423/353, 423/359, 409, 411, 412; 75/10.62
See application file for complete search history.

(56) References Cited

U.S. PATENT DOCUMENTS

| | | | | |
|---|---|---|---|---|
| 2,601,221 A * | 6/1952 | Cohn et al. | ............... | 252/375 |
| 2,706,147 A * | 4/1955 | Paull | .................. | 423/353 |
| 3,848,068 A * | 11/1974 | Rice | .................. | 423/335 |
| 4,451,436 A | 5/1984 | OHare | | |
| 4,704,267 A * | 11/1987 | DiMartino | ............ | 423/658.2 |
| 4,869,892 A * | 9/1989 | Sood et al. | ............ | 423/412 |
| 6,146,437 A * | 11/2000 | Fourie | .............. | 75/10.14 |
| 6,471,932 B1 | 10/2002 | Gieshoff et al. | | |
| 6,936,363 B2 * | 8/2005 | Kordesch et al. | ........... | 429/17 |
| 7,232,556 B2 * | 6/2007 | Yadav | ............... | 423/592.1 |
| 2002/0028171 A1 * | 3/2002 | Goetsch et al. | ........... | 423/237 |
| 2005/0126438 A1 | 6/2005 | Blinkle et al. | | |

* cited by examiner

*Primary Examiner*—Wayne Langel
(74) *Attorney, Agent, or Firm*—Wells St. John

(57) ABSTRACT

A method for forming ammonia is disclosed and which includes the steps of forming a plasma; providing a source of metal particles, and supplying the metal particles to the plasma to form metal nitride particles; and providing a substance, and reacting the metal nitride particles with the substance to produce ammonia, and an oxide byproduct.

20 Claims, 2 Drawing Sheets

METHOD FOR FORMING AMMONIA

GOVERNMENT RIGHTS

This invention was made with Government support under Contract DE-AC07-05ID14517 awarded by the U.S. Department of Energy. The Government has certain rights in the invention.

TECHNICAL FIELD

The present invention relates to a method for forming ammonia, and more specifically to a method for forming ammonia on-site, and which further provides a convenient means for readily generating hydrogen from a source of water.

BACKGROUND OF THE INVENTION

Various methodology and techniques are available for the production of ammonia which is useful in various agricultural and other manufacturing processes. Those skilled in the art have long recognized that the synthesis of anhydrous ammonia, as well as the extraction of hydrogen from water for various end uses is not very attractive from an economic standpoint because of process inefficiencies. Additionally, readily identified hazards exist relative to the shipment and handling of anhydrous ammonia which is delivered to various end users across the nation. A new method for forming ammonia and the production of hydrogen from that same ammonia in an efficient safe and cost effective fashion is the subject matter of the present application.

SUMMARY OF THE INVENTION

A first aspect of the present invention relates to a method for forming ammonia and which includes forming a plasma; providing a source of metal particles, and supplying the metal particles to the plasma to form metal nitride particles; and providing a substance, and reacting the metal nitride particles with the substance to produce ammonia, and an oxide byproduct.

Still further, another aspect of the present invention relates to a method for forming ammonia which includes providing a source of electricity; providing a source of nitrogen, and generating a plasma by utilizing the source of electricity; providing a source of metal particles, and supplying the metal particles to the plasma to form, at least in part, metal nitride and/or metal oxynitride nanoparticles; recovering the metal nitride and/or metal oxynitride particles; providing a source of high temperature water, in liquid and/or vapor form, and reacting the metal nitride and/or metal oxynitride particles with the high temperature water to produce, at least in part, ammonia and a substantially solid byproduct; and separating the ammonia from the byproduct.

Still further, another aspect of the present invention relates to a method for forming ammonia and which includes creating a plasma from a source electricity and a source of nitrogen; providing a source of metal particles to the plasma under conditions which facilitate the production of metal nitride and/or metal oxynitride particles; recovering the metal nitride and/or metal oxynitride particles; providing a source of heated water and chemically reacting the metal nitride and/or metal oxynitride particles with the source of heated water to generate, at least in part, ammonia and a metal hydroxide; separating the ammonia from the metal hydroxide; providing a thermal chemical cracking assembly and supplying the ammonia to the chemical cracking assembly under conditions which facilitate the decomposition of the ammonia to produce a gaseous mixture which comprises, at least in part, nitrogen and hydrogen; separating the nitrogen gas from hydrogen gas; returning, at least in part, the nitrogen gas produced by the thermal chemical cracking assembly back to form a plasma; and delivering the hydrogen gas to an end user.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
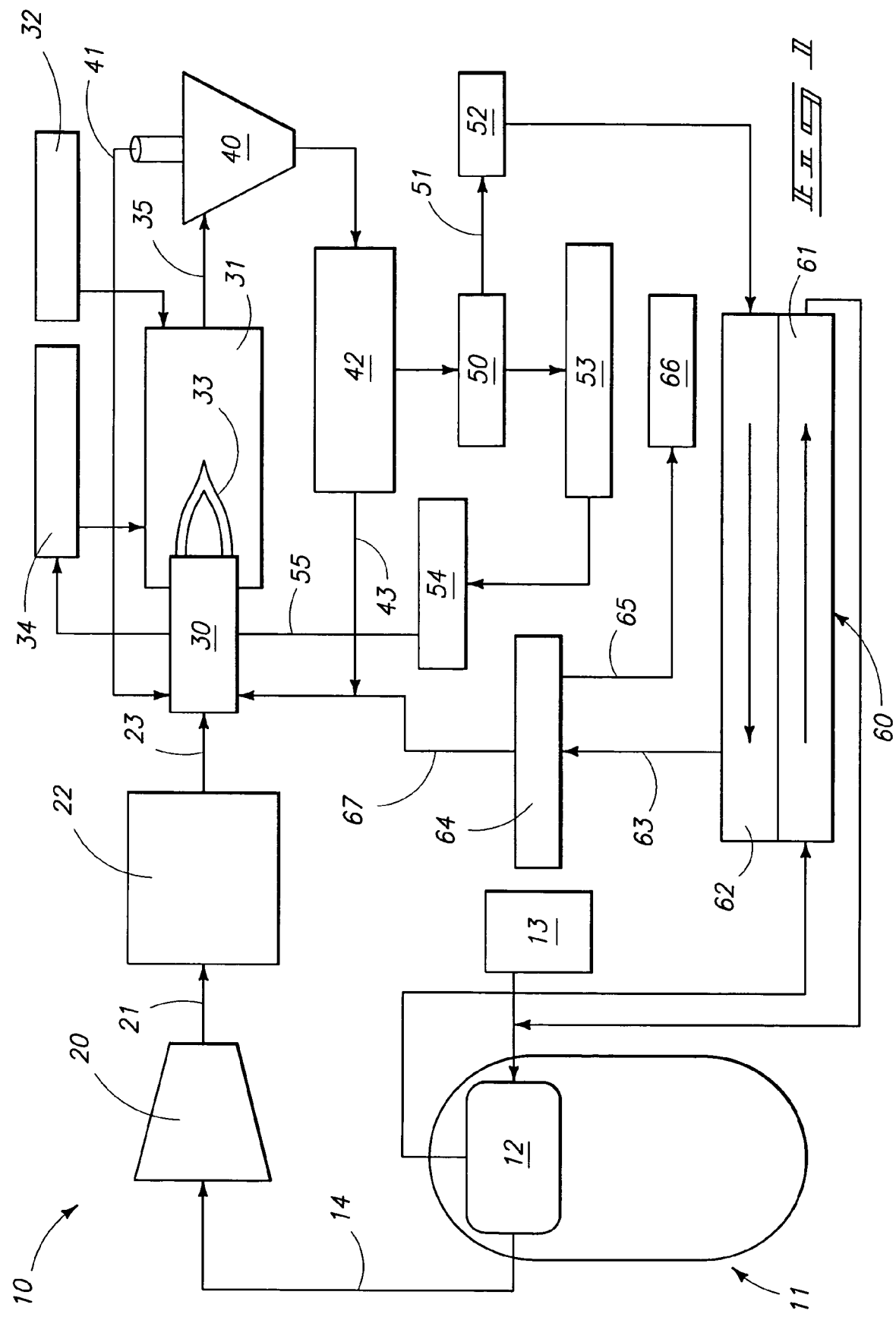
FIG. 1 is a greatly simplified schematic view which shows one aspect of the present invention.
Figure 2:
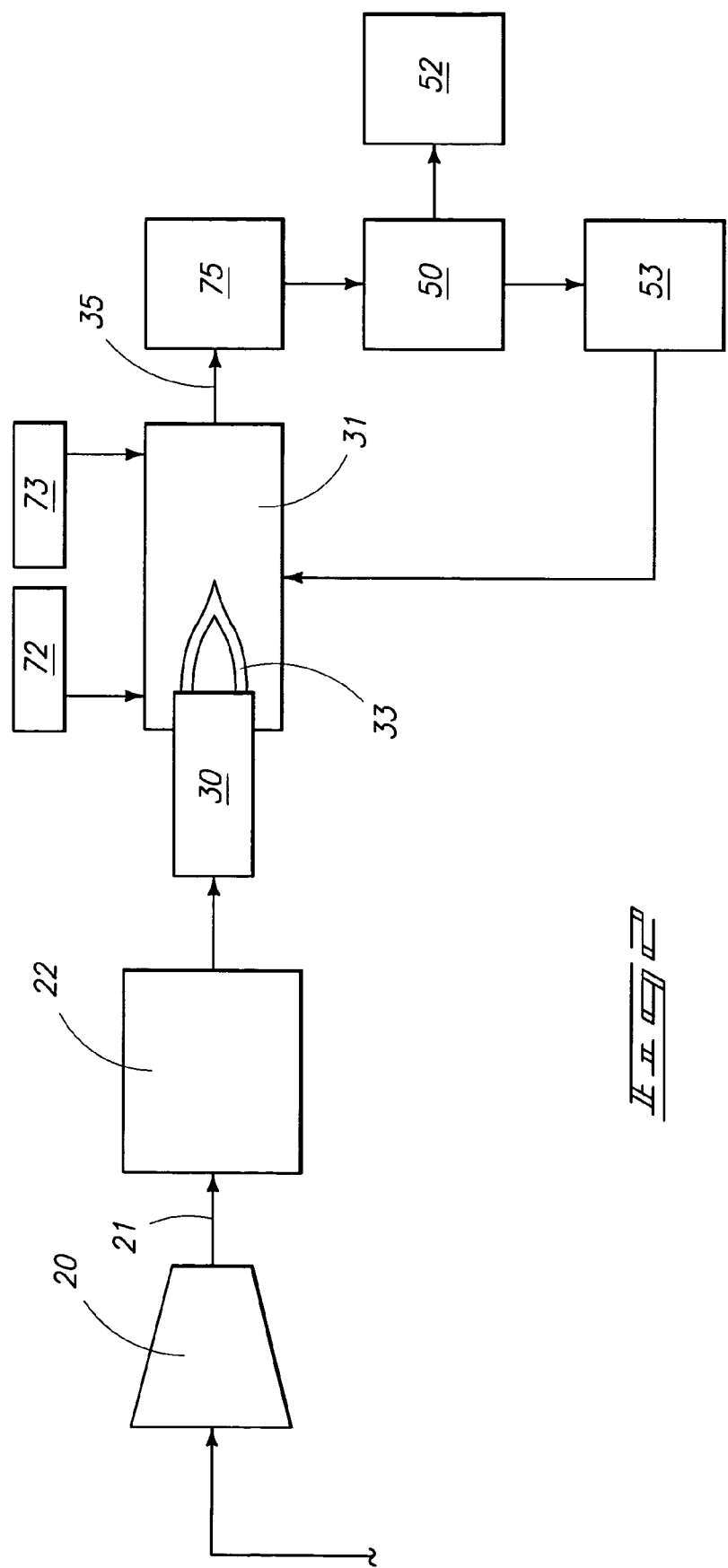
FIG. 2 is a greatly simplified fragmentary schematic view of a second aspect of the present invention.

Referring now to FIGS. 1 and 2, the present methodology is generally indicated by the numeral 10. As seen in FIG. 1, the present methodology for forming ammonia includes a first step of providing an electrical generation facility which is generally indicated by the numeral 11. The electrical generation facility may be powered from traditional fossil fuels such as natural gas, oil or coal or may be nuclear powered. The electrical generation facility produces heat energy as a result of its operation. As seen in FIG. 1, a steam generation component or facility is made integral with the electrical generation facility. The steam generation component 12 is coupled with a source of water 13. The water supplied to the steam generation component, when exposed to the heat as provided for by the electrical generation facility is operable to produce a source of high pressure steam which is generally indicated by the numeral 14. This high pressure steam is directed or otherwise supplied to a steam turbine 20 of conventional design. Those skilled in the art understand that high pressure steam once received in the steam turbine is operable to produce a mechanical power output which is generally indicated by the numeral 21. The mechanical power output 21 of the steam turbine is mechanically coupled with a generator 22 of conventional design. The generator 22, upon receiving the mechanical power output of the steam turbine 20 produces an electrical power output 23 which is supplied, at least in part, to a plasma torch 30 of traditional design.

As seen in FIG. 1, the methodology of the present invention includes, as another step, forming a plasma, as will be described. In this regard, the plasma torch 30 is coupled in fluid flowing relation relative to a container or reactor 31. Coupled in fluid flowing relation relative to the container or reactor 31 is a source of gas, such as nitrogen 32. The nitrogen, when supplied to the container or reactor 31, produces a resulting plasma 33. The methodology includes a further step of providing a source of metal particles or powder 34, and supplying the metal particles to the plasma 33 to form metal nitride particles which will be described hereinafter. As seen in FIG. 1, the methodology as shown includes the steps of creating a plasma 33 from a source of electricity 11 and from the source of nitrogen 32, and providing a source of metal particles 34 to the plasma 33 under conditions which facilitate the production of a metal nitride and/or metal oxynitride 35 as seen in FIG. 1. The metal particles, referenced above, are selected from the group comprising iron; chromium; cobalt; nickel; copper; zinc; lithium; manganese; strontium; magnesium; and similar metals.

As should be understood, the metal particles provided from the source of metal powder or particles 34 are, in one form of the invention, nanometer sized. Still further, the gas 32 which is selected may include a number of different gases including air; air and hydrogen; nitrogen and hydrogen; nitrogen and argon; helium and nitrogen; and methane and nitrogen. All these gases combine to form a resulting plasma 33. Referring still to FIG. 1, it will be seen that the present methodology includes a step of providing a separator assembly 40, and which receives the metal nitride and/or oxynitride particles 35 which are formed when the source of metal powder or particles 34 are chemically reacted with the source of nitrogen 32 in the plasma 33. The separator 40 substantially separates and recovers any unreacted gas 32 from the metal nitride and/or oxynitride particles. The separator 40 is coupled in fluid flowing relation relative to the plasma torch so as to return any recovered unreacted gas, such as nitrogen 41, back to the plasma torch 30 for further reaction. The recovered metal nitride and/or oxynitride particles provided by the separator 40 are then removed from the separator 40 at the step labeled 42. As further illustrated in FIG. 1, any remaining unreacted gas such as nitrogen 43 is removed from the recovered nitride/oxynitride particles 42 and is thereafter returned to the plasma torch 30 so as to be combined with the source of electricity as provided by the electrical generation facility 11 to generate the resulting plasma 33.

In the methodology as described for forming ammonia 10, the method includes another step of providing a substance 50 and reacting the metal nitride particles 42 with the substance 50 to produce ammonia 51 and an oxide byproduct 53. The ammonia is collected to provide a source of same at the step labeled 52. As seen in FIG. 1, the substance, as described above, includes a step of providing a source of high temperature water 50, and wherein the source of the water is either in a vapor and/or liquid form, and reacting the metal nitride and/or oxynitride particles 42 to produce, at least in part, ammonia 51, and a substantially solid byproduct 53 which includes a metal hydroxide; hydrated oxide; oxyhydroxide and/or combinations thereof. As seen in FIG. 1, the byproduct 53, as noted above, is later subjected to a chemical reduction step 54 which substantially recovers the metal particles 54. These metal particles are then delivered back to the plasma at step 55 so as to generate, at least in part, additional metal nitride and/or metal oxynitride particles.

Referring still to FIG. 1, the methodology 10 of the present invention includes a step of providing a thermal decomposition/cracking assembly which is generally indicated by the numeral 60. The cracking assembly 60 is coupled in fluid flowing relation relative to the source of ammonia 52. The thermal decomposition/cracking assembly 60 has a heat exchanger portion 61, and a decomposition chamber 62. The heat exchanger portion is coupled in fluid flowing relation and in heat receiving relation relative to the steam generation component 12, of the electrical generation facility 11. As arranged in FIG. 1, the heat of the high pressure steam is provided to the heat exchanger portion 61, and is subsequently transferred to the decomposition chamber 62. The decomposition chamber 62 is further coupled in fluid flowing relation relative to the source of ammonia 52. In the illustrated arrangement, the ammonia 52 travels through the decomposition chamber 62, where it is decomposed, and provides a gas output 63 which may include, at least in part, a mixture of hydrogen and nitrogen. The gas output 63 is directed or supplied to conventional separation equipment which is generally indicated by the numeral 64, and where the gas output, which includes nitrogen and hydrogen are separated from each other based upon their molecular size. As seen, in FIG. 1, the nitrogen 67 is returned back to the plasma torch 30 where it is then combined with the electricity provided by the source of electricity 11 in order to provide the plasma 33. The separation equipment, as indicated by the numeral 64, also provides a supply of hydrogen 65 which is then provided to an end user 66.

Therefore as seen in FIG. 1, the methodology of the present invention 10 includes the steps of separating the ammonia 52 from the metal hydroxide 53, and further the step of providing a thermal cracking assembly 60 and supplying the ammonia 52 to the thermal chemical cracking assembly under conditions which facilitate the decomposition of the ammonia to produce a gaseous mixture which comprises, at least in part, nitrogen and hydrogen 63. The methodology further includes the step of separating the nitrogen gas from the hydrogen gas at step 64 and returning, at least in part, the nitrogen gas produced by the thermal chemical cracking assembly back to the nitrogen plasma at step 67. Still further, the methodology includes the step of delivering the hydrogen gas 65 to and end user 66. As seen in FIG. 1, the thermal chemical cracking assembly is provided, at least in part, with the heat produced by the electrical power generation facility 1. In the arrangement as seen, it is conceivable that the source of high temperature water, and the liquid and/or vapor 50 which is utilized to react the metal nitride and/or oxynitride particles 42 in order to produce the ammonia 52, and the substantially solid byproduct 53 can be provided directly from the electrical generation facility 11.

Referring now to both FIGS. 1 and 2, it should be understood that the metal particles 34 may be selected from the group comprising iron; chromium; cobalt; nickel; copper; zinc; lithium; manganese; strontium; magnesium; and similar metals. With respect to FIG. 2, it will be understood that the present methodology 10 may be modified to include a series of alternative steps whereby the plasma torch 30, as earlier described, is electrically coupled to the generator 22 and the turbine 20. It will be understood that the power for the turbine comes from the steam generated by the electrical generation facility 11. In the arrangement as shown in FIG. 2, the plasma torch 30 is coupled to a gas source such as nitrogen 72 and a source of a hydrocarbon which may include, such materials and/or gasses such as methane, or a source of carbon and high temperature steam 73. In the arrangement as seen in FIG. 2, and which can be substituted for step 54 as seen in FIG. 1, the source of the metal hydroxide 53 is supplied to the plasma torch 30 and received within the container 31. The metal hydroxide chemically reacts with the plasma 33 in order to produce a resulting chemical nitride 75. The chemical or other metal nitride 75 is thereafter combined or otherwise chemically reacted with the source of high temperature water at step 50 to produce the source of ammonia 52 which is then returned to the process as seen in FIG. 1. Still further, the reaction of the metal nitride 75 with the source of the high temperature water 50 produces a resulting metal hydroxide 53 which as seen in FIG. 2, is then returned to the plasma torch 30 in order to chemically react again and produce the resulting chemical or other metal nitride particle 75.

Therefore, the methodology as seen in FIG. 2 includes the steps of providing a source of a gas such as nitrogen 72, and a hydrocarbon 73; forming a nitrogen hydrocarbon plasma 33; reacting the metal hydroxide 53 which has been separated from the ammonia 52 in the nitrogen-hydrocarbon plasma to produce additional metal nitride particles, and a byproduct which includes, at least in part, hydrogen gas, and wherein the hydrogen gas is delivered to the end user; and reacting the additional metal nitride particles with the source of heated water 50 to generate, at least in part, the ammonia 52 and the metal hydroxide 53. As seen in FIG. 2, and as discussed above, the hydrocarbon may comprise methane, or may further comprise a source of steam and carbon.

OPERATION

The operation of the described embodiment of the present invention is believed to be readily apparent and is briefly summarized at this point.

A method for forming ammonia 10 of the present invention can be seen in FIG. 1 and broadly includes the steps of forming a plasma 33; providing a source of metal particles 34 to the plasma 33 to form metal nitride particles 35; and providing a substance 50, and reacting the metal nitride particles with the substance 50 to produce ammonia 52, and an oxide byproduct 53.

Another aspect of the present invention relates to a method 10 for forming ammonia of the present invention which includes the steps of providing a source of electricity 11; and providing a source of nitrogen 32, and generating a plasma 33 by utilizing the source of electricity. Still further, the methodology includes the step of providing a source of metal particles 34, and supplying the metal particles to the plasma 33 to form, at least in part, metal nitride and/or metal oxynitride particles 35. The methodology of the present invention further includes a step of recovering the metal nitride and/or metal oxynitride particles 40; and providing a source of high temperature water in liquid and/or vapor form 50, and reacting the metal nitride and/or metal oxynitride particles with the high temperature water to produce, at least in part, ammonia 52, and a substantially solid byproduct 53. Still further, the methodology includes a step of separating the ammonia from the byproduct 54 as seen in FIG. 1.

Still further, the method for forming ammonia of the present invention 10 also includes the step of creating a plasma 30 from a source electricity 11 and a source of nitrogen 32. The method also includes the step of providing a source of metal particles 34 to the plasma 33 under conditions which facilitate the production of metal nitride and/or metal oxynitride particles 35. Additionally, the method includes the step of recovering the metal nitride and/or metal oxynitride particles at a step 40. The method of the present invention also includes the step of providing a source of heated water 50, and chemically reacting the metal nitride and/or metal oxynitride particles with the source of heated water to generate, at least in part, ammonia 52, and a metal hydroxide 53. The method also includes a step of separating the ammonia from the metal hydroxide as seen in FIG. 1. Still further, the method includes a step of providing a thermal chemical cracking assembly 60, and supplying the ammonia 52 to the chemical cracking assembly 60 under conditions which facilitate the decomposition of the ammonia 52 to produce a gaseous mixture which comprises, at least in part, nitrogen and hydrogen 63. The present method also includes a step of separating the nitrogen gas from the hydrogen gas at a step 64 and returning, at least in part, the nitrogen gas produced by the thermal chemical cracking assembly 67 back to the plasma 33. Still further, the method includes the step of delivering the hydrogen gas to an end user 66.

Referring now to FIG. 2, the method also includes a further step of providing, a source of a gas such as nitrogen 72, and a hydrocarbon 73, and forming a nitrogen-hydrocarbon plasma as indicated by the numeral 74. The method also includes a step of reacting the metal hydroxide 53 which has been separated from the ammonia 52 in the nitrogen-hydrocarbon plasma to produce additional metal nitride particles 75, and a byproduct which includes, at least in part, hydrogen gas, and wherein the hydrogen gas is delivered to the end user. Further, the method includes the step of reacting the metal nitride particles with the source of heated water 50 to generate, at least in part, the ammonia and the metal hydroxide.

Therefore it will be seen that the present invention provides a convenient means by which ammonia can be generated on site and further water can be conveniently converted to hydrogen in a fashion not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method for forming ammonia, comprising:
    forming a plasma from a gas, and wherein the gas is selected from the group consisting of nitrogen; air and hydrogen; nitrogen and hydrogen; nitrogen and argon; helium and nitrogen; and methane and nitrogen;
    providing a source of metal particles, and supplying the metal particles to the plasma to form metal nitride particles;
    providing a source of water in liquid and/or vapor form, and reacting the metal nitride particles with the source of water;
    elevating the temperature of the water so as to increase a speed of chemical reaction of the metal nitride particles with the source of water to produce, at least in part, ammonia and a metal hydroxide;
    separating the ammonia from the metal hydroxide;
    reducing the metal hydroxide so as to substantially recover the metal particles; and
    supplying the recovered metal particles back to the plasma to generate more metal nitride particles.

2. A method as claimed in claim 1, and wherein the metal nitride particles are nanometer sized.

3. A method as claimed in claim 1, and wherein the step of providing the plasma comprises providing a plasma which is composed, at least in part, of nitrogen, and wherein the method further comprises:
    decomposing the ammonia to produce a mixture of nitrogen and hydrogen gas;
    separating the nitrogen gas from the hydrogen gas; and
    supplying the nitrogen gas back to the plasma.

4. A method as claimed in claim 3, and wherein the step of decomposing the ammonia to produce the mixture of nitrogen and hydrogen gas further comprises:
    providing a thermal chemical cracking assembly, and supplying the ammonia to the thermal chemical cracking assembly to produce the mixture of nitrogen and hydrogen gas.

5. A method as claimed in claim 1, and wherein the metal nitride particles comprise a metal oxynitride.

6. A method as claimed in claim 1, and further comprising:
    providing an electrical generation facility which generates electrical power; and supplying a portion of the electrical power generated by the electrical power generation facility to form the plasma, and to elevate the temperature of the water, at least in part, so as to increase the speed of the chemical reaction of the metal nitride particles with the water to produce the ammonia and the metal hydroxide.

7. A method as claimed in claim 6, and wherein the step of providing the electrical power generation facility further comprises:

producing high temperature water, steam and heat as a byproduct;

supplying, at least in part, a portion of the high temperature water, and steam to elevate the temperature of the water to increase the speed of the chemical reaction of the metal nitride particles with the water to produce the ammonia and the metal hydroxide.

8. A method as claimed in claim 6, and further comprising:
providing a thermal chemical cracking assembly;
supplying the thermal chemical cracking assembly, at least in part, with the heat produced by the electrical power generation facility; and
supplying the ammonia to the thermal chemical cracking assembly for a time period which facilitates the decomposition of the ammonia into a gas mixture which comprises, at least in part, nitrogen and hydrogen.

9. A method for forming ammonia, comprising:
providing a source of electricity;
providing a source of nitrogen, and generating a plasma by utilizing the source of electricity;
providing a source of metal particles, and supplying the metal particles to the plasma to form, at least in part, metal nitride and/or metal oxynitride particles;
recovering the metal nitride and/or metal oxynitride particles;
providing a source of high temperature water in liquid and/or vapor form, and reacting the metal nitride and/or metal oxynitride particles with the high temperature water to produce, at least in part, ammonia and a substantially solid byproduct;
separating the ammonia from the byproduct;
providing an electrical power generation facility which provides the electrical power which is utilized to form the plasma, and which further provides, as a by product, heat energy, and the source of high temperature water;
providing a thermal chemical cracking assembly;
supplying the thermal chemical cracking assembly with the heat energy provided by the electrical power generation facility;
supplying the ammonia to the thermal chemical cracking facility for a time period which is sufficient to decompose the ammonia, and produce a gaseous mixture which comprises, at least in part, nitrogen and hydrogen;
separating the nitrogen gas from the hydrogen gas;
delivering the nitrogen gas back to the plasma; and
delivering the hydrogen gas to an end user.

10. A method as claimed in claim 9, and wherein after the step of separating the ammonia from the byproduct, the method further comprising:
recovering the metal particles; and
supplying the recovered metal particles back to the plasma so as to generate additional metal nitride particles.

11. A method as claimed in claim 10, and wherein the byproduct comprises, at least in part, a metal hydroxide, and wherein the step of recovering the metal particles further comprises chemically reducing the metal particles so as to substantially recover the metal particles.

12. A method as claimed in claim 9, and wherein the byproduct comprises, at least in part, a metal hydroxide, and wherein the method further comprises delivering the metal hydroxide byproduct back to the plasma to generate, at least in part, additional metal nitride and/or oxynitride particles.

13. A method as claimed in claim 9, and wherein the metal particles are selected form the group consisting of iron; chromium; cobalt; nickel; copper; zinc; lithium; strontium; and magnesium.

14. A method for forming hydrogen from ammonia comprising:
creating a plasma from a source of electricity and a source of nitrogen;
providing a source of metal particles to the plasma under conditions which facilitate the production of metal nitride and/or metal oxynitride particles;
recovering the metal nitride and/or metal oxynitride particles;
providing a source of heated water and chemically reacting the metal nitride and/or metal oxynitride particles with the source of heated water to generate, at least in part, ammonia and a metal hydroxide;
separating the ammonia from the metal hydroxide;
providing a thermal chemical cracking assembly, and supplying the ammonia to the chemical cracking assembly under conditions which facilitate the decomposition of the ammonia to produce a gaseous mixture which comprises, at least in part, nitrogen and hydrogen;
separating the nitrogen gas from hydrogen gas;
returning, at least in part, the nitrogen gas produced by the thermal chemical cracking assembly back to the plasma; and
delivering the hydrogen gas to an end user.

15. A method as claimed in claim 14, and further comprising:
reducing the metal hydroxide so as to substantially recover the metal particles; and
delivering the metal particles back to the plasma so as to generate, at least in part, additional metal nitride and/or metal oxynitride particles.

16. A method as claimed in claim 14, and further comprising:
providing an electrical power generation facility which produces the source of electricity which creates, at least in part, the plasma, and wherein the electrical power generation facility further produces, at least in part, the source of heated water which chemically reacts with the metal nitride and/or metal oxynitride particles to generate, at least in part, the ammonia and the metal hydroxide, and heat energy; and
supplying, at least in part, the heat energy generated by the electrical power generation facility to the thermal chemical cracking assembly to facilitate the decomposition of the ammonia to produce the gaseous mixture which comprises, at least in part, the nitrogen and hydrogen.

17. A method as claimed in claim 14, and further comprising: providing a source of nitrogen and hydrocarbon and forming a nitrogen-hydrocarbon plasma;
reacting the metal hydroxide which has been separated from the ammonia in the nitrogen-hydrocarbon plasma to produce additional metal nitride particles, and a byproduct which includes, at least in part, hydrogen gas, and wherein the hydrogen gas is delivered to the end user; and reacting the additional metal nitride particles with the source of heated water to generate, at least in part, the ammonia and the metal hydroxide.

18. A method as claimed in claim 17, and wherein the hydrocarbon comprises methane.

19. A method as claimed in claim 17, and wherein the hydrocarbon comprises a source of steam and carbon.

20. A method for forming hydrogen from ammonia, comprising:

forming a plasma from a source of nitrogen;

supplying a source of metal particles to the plasma to form metal nitride particles;

reacting the metal nitride particles with a source of high temperature water to produce ammonia, and a metal hydroxide;

separating the ammonia from the metal hydroxide;

reducing the metal hydroxide so as to substantially recover the metal particles;

providing a thermal chemical cracking assembly;

decomposing the ammonia with the thermal cracking assembly to produce a gaseous mixture which comprises, at least in part, nitrogen and hydrogen;

separating the nitrogen gas from the hydrogen gas;

delivering the nitrogen gas back to the plasma; and delivering the hydrogen gas to an end user.

* * * * *